United States Patent
Al-Jindan et al.

(10) Patent No.: US 11,460,330 B2
(45) Date of Patent: Oct. 4, 2022

(54) REDUCING NOISE IN A VORTEX FLOW METER

(71) Applicant: Saudi Arabian Oil Company, Dhahran (SA)

(72) Inventors: Jana M. Al-Jindan, Dammam (SA); Mohamed Nabil Noui-Mehidi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/921,104

(22) Filed: Jul. 6, 2020

(65) Prior Publication Data

US 2022/0003582 A1 Jan. 6, 2022

(51) Int. Cl.
  *G01F 1/32* (2022.01)
  *G01F 1/325* (2022.01)

(52) U.S. Cl.
  CPC .......... *G01F 1/3218* (2013.01); *G01F 1/3266* (2022.01); *G01F 1/3282* (2022.01)

(58) Field of Classification Search
  CPC ..... G01F 1/3209; G01F 1/3219; G01F 1/3218
  See application file for complete search history.

(56) References Cited

U.S. PATENT DOCUMENTS

| | | | |
|---|---|---|---|
| 2,145,745 A | 1/1939 | Armstrong et al. | |
| 2,699,212 A | 1/1955 | Dismukes | |
| 2,804,148 A | 8/1957 | Schremp et al. | |
| 3,254,720 A | 8/1966 | Huitt | |
| 3,302,717 A | 2/1967 | West et al. | |
| 3,354,955 A | 11/1967 | Berry | |
| 3,419,080 A | 12/1968 | Lebourg | |
| 3,448,305 A | 6/1969 | Raynal et al. | |
| 3,525,398 A | 8/1970 | Fisher | |
| 3,558,936 A | 1/1971 | Horan | |
| 3,649,485 A | 3/1972 | Chisholm | |
| 3,663,845 A | 5/1972 | Apstein | |

(Continued)

FOREIGN PATENT DOCUMENTS

| | | |
|---|---|---|
| CN | 202916242 | 5/2013 |
| CN | 103733061 | 4/2014 |

(Continued)

OTHER PUBLICATIONS

"Constructing Experiment Platform of Ultrasonic Attenuation Concentration Meter", Nov. 2007, 3 pages English Abstract.

(Continued)

*Primary Examiner* — Erika J. Villaluna
(74) *Attorney, Agent, or Firm* — Fish & Richardson P.C.

(57) ABSTRACT

A vortex flow meter is within a flow conduit. The vortex flow meter includes a housing defining a flow passage substantially in-line with the flow conduit. An actuable buff body is within the flow passage. A sensor is downstream of the actuable buff body and is attached to the housing. The sensor is configured to detect vortex shedding. A controller is configured to send a drive signal to an oscillator to oscillate the buff body. The controller is configured to receive a vortex stream from the sensor. The vortex stream is indicative of vortexes shed by the buff body within a fluid. The controller is configured to determine a flow velocity responsive to the received vortex stream.

15 Claims, 6 Drawing Sheets

(56) References Cited

U.S. PATENT DOCUMENTS

| | | | |
|---|---|---|---|
| 3,680,375 A * | 8/1972 | Joy | G01F 1/3281 |
| | | | 73/861.23 |
| 3,762,476 A | 10/1973 | Gall | |
| 3,943,005 A | 3/1976 | Mund | |
| 3,970,877 A | 7/1976 | Russell et al. | |
| 4,080,837 A | 3/1978 | Alexander et al. | |
| 4,118,294 A | 10/1978 | Pellegri | |
| 4,163,770 A | 8/1979 | Porosoff | |
| 4,262,745 A | 4/1981 | Stewart | |
| 4,318,303 A | 3/1982 | Harrington | |
| 4,381,674 A | 5/1983 | Abts | |
| 4,387,318 A | 6/1983 | Kolm et al. | |
| 4,390,067 A | 6/1983 | Willman | |
| 4,437,349 A | 3/1984 | Joy | |
| 4,508,389 A | 4/1985 | Hodges | |
| 4,526,480 A | 7/1985 | Ward | |
| 4,527,420 A | 7/1985 | Foote | |
| 4,536,674 A | 8/1985 | Schmidt | |
| 4,572,295 A | 2/1986 | Walley | |
| 4,630,484 A | 12/1986 | Mizuno et al. | |
| 4,662,440 A | 5/1987 | Harmon | |
| 4,687,061 A | 8/1987 | Uhri | |
| 4,754,808 A | 7/1988 | Harmon | |
| 4,817,721 A | 4/1989 | Pober | |
| 4,819,723 A | 4/1989 | Whitfill | |
| 4,853,507 A | 8/1989 | Samardzija | |
| 4,873,121 A | 10/1989 | Strack et al. | |
| 4,974,675 A | 12/1990 | Austin | |
| 5,004,886 A | 4/1991 | Born | |
| 5,016,710 A | 5/1991 | Renard | |
| 5,070,725 A | 12/1991 | Cox et al. | |
| 5,072,087 A | 12/1991 | Apte | |
| 5,074,360 A | 12/1991 | Guinn | |
| 5,095,758 A | 3/1992 | Cox et al. | |
| 5,115,670 A | 5/1992 | Shen | |
| 5,148,405 A | 9/1992 | Belchamber et al. | |
| 5,150,619 A | 9/1992 | Turner | |
| 5,161,615 A | 11/1992 | Hutchins et al. | |
| 5,228,510 A | 7/1993 | Jennings, Jr. | |
| 5,317,223 A | 5/1994 | Kiesewetter et al. | |
| 5,415,048 A | 5/1995 | Diatschenko et al. | |
| 5,450,902 A | 9/1995 | Matthews | |
| 5,561,245 A | 10/1996 | Georgi et al. | |
| 5,714,691 A | 2/1998 | Hill | |
| 5,741,293 A | 4/1998 | Wijay | |
| 5,965,964 A | 10/1999 | Skinner et al. | |
| 6,056,882 A | 5/2000 | Scalliet | |
| 6,077,400 A | 6/2000 | Kartchner | |
| 6,095,244 A | 8/2000 | Graham | |
| 6,102,120 A | 8/2000 | Chen et al. | |
| 6,119,776 A | 9/2000 | Graham et al. | |
| 6,151,958 A | 11/2000 | Letton et al. | |
| 6,196,312 B1 | 3/2001 | Collins et al. | |
| 6,214,236 B1 | 4/2001 | Scalliet | |
| 6,320,156 B1 | 11/2001 | Yamaguchi | |
| 6,425,448 B1 | 7/2002 | Zupanick | |
| 6,431,282 B1 | 8/2002 | Bosma et al. | |
| 6,452,068 B1 | 9/2002 | Zuo et al. | |
| 6,467,358 B1 | 10/2002 | Nishi | |
| 6,488,087 B2 | 12/2002 | Longbottom | |
| 6,504,258 B2 | 1/2003 | Schultz et al. | |
| 6,540,777 B2 | 4/2003 | Stenzel | |
| 6,547,003 B1 | 4/2003 | Bangash et al. | |
| 6,550,535 B1 | 4/2003 | Traylor | |
| 6,593,281 B2 | 7/2003 | Hayden | |
| 6,655,221 B1 | 12/2003 | Aspelund et al. | |
| 6,672,385 B2 | 1/2004 | Kilaas et al. | |
| 6,729,394 B1 | 5/2004 | Hassan | |
| 6,768,214 B2 | 7/2004 | Schultz et al. | |
| 6,831,470 B2 | 12/2004 | Xie et al. | |
| 6,834,725 B2 | 12/2004 | Whanger et al. | |
| 6,938,470 B2 | 9/2005 | DiFoggio et al. | |
| 6,993,979 B2 | 2/2006 | Segeral | |
| 7,036,356 B2 | 5/2006 | Leppanen et al. | |
| 7,128,159 B2 | 10/2006 | Le Cunff | |
| 7,162,918 B2 | 1/2007 | DiFoggio et al. | |
| 7,199,480 B2 | 4/2007 | Fripp et al. | |
| 7,224,077 B2 | 5/2007 | Allen | |
| 7,242,103 B2 | 7/2007 | Tips | |
| 7,249,805 B2 | 7/2007 | Cap | |
| 7,317,989 B2 | 1/2008 | DiFoggio et al. | |
| 7,345,372 B2 | 3/2008 | Roberts et al. | |
| 7,357,189 B2 | 4/2008 | Aldaz et al. | |
| 7,370,696 B2 | 5/2008 | Al-Muraikhi | |
| 7,380,595 B2 | 6/2008 | Wetzel et al. | |
| 7,419,005 B2 | 9/2008 | Al-Muraikhi | |
| 7,486,248 B2 | 2/2009 | Halek et al. | |
| 7,540,200 B2 | 6/2009 | Yung et al. | |
| 7,562,584 B2 | 7/2009 | Conquergood | |
| 7,624,649 B2 * | 12/2009 | Keese | G01F 1/3209 |
| | | | 73/861.22 |
| 7,637,316 B2 | 12/2009 | Best | |
| 7,665,537 B2 | 2/2010 | Patel et al. | |
| 7,775,125 B2 | 8/2010 | Rhodes | |
| 7,775,961 B2 | 8/2010 | Meikrantz | |
| 7,810,563 B2 | 10/2010 | Buijse et al. | |
| 7,823,635 B2 | 11/2010 | Wright et al. | |
| 7,842,276 B1 | 11/2010 | Linkous | |
| 7,847,421 B2 | 12/2010 | Gardner et al. | |
| 7,891,416 B2 | 2/2011 | Pankratz et al. | |
| 7,906,861 B2 | 3/2011 | Guerrero et al. | |
| 7,908,930 B2 | 3/2011 | Xie et al. | |
| 8,041,510 B2 | 10/2011 | Dasgupta | |
| 8,047,232 B2 | 11/2011 | Bernitsas | |
| 8,061,186 B2 | 11/2011 | Gysling | |
| 8,072,226 B2 | 12/2011 | Park | |
| 8,143,887 B2 | 3/2012 | Pusiol | |
| 8,258,644 B2 | 9/2012 | Kaplan | |
| 8,421,251 B2 | 4/2013 | Pabon et al. | |
| 8,426,988 B2 | 4/2013 | Hay | |
| 8,431,015 B2 | 4/2013 | Banerjee | |
| 8,490,685 B2 | 7/2013 | Tolman | |
| 8,521,436 B2 | 8/2013 | Agar | |
| 8,522,625 B2 * | 9/2013 | Philipps | G01F 25/0007 |
| | | | 73/861.52 |
| 8,523,936 B2 | 9/2013 | Schmid et al. | |
| 8,564,179 B2 | 10/2013 | Ochoa et al. | |
| 8,586,898 B2 | 11/2013 | Novak | |
| 8,604,634 B2 | 12/2013 | Pabon et al. | |
| 8,631,872 B2 | 1/2014 | East | |
| 8,633,689 B2 | 1/2014 | Li et al. | |
| 8,638,002 B2 | 1/2014 | Lu | |
| 8,648,480 B1 | 2/2014 | Liu et al. | |
| 8,786,113 B2 | 7/2014 | Tinnen et al. | |
| 8,916,983 B2 | 12/2014 | Marya et al. | |
| 8,925,627 B2 | 1/2015 | Tupper et al. | |
| 8,925,649 B1 | 1/2015 | Wiebe et al. | |
| 9,063,252 B2 | 6/2015 | Kamal | |
| 9,091,144 B2 | 7/2015 | Swanson et al. | |
| 9,106,159 B1 | 8/2015 | Wiebe et al. | |
| 9,116,105 B2 | 8/2015 | Venemso et al. | |
| 9,121,237 B2 | 9/2015 | Kumar | |
| 9,130,161 B2 | 9/2015 | Nair et al. | |
| 9,147,884 B2 | 9/2015 | Merzougui et al. | |
| 9,187,992 B2 | 11/2015 | Cherian | |
| 9,222,817 B2 * | 12/2015 | Berkcan | G01F 1/3209 |
| 9,239,043 B1 | 1/2016 | Zeas | |
| 9,322,255 B2 | 4/2016 | Diehl et al. | |
| 9,322,389 B2 | 4/2016 | Tosi | |
| 9,429,456 B2 | 8/2016 | Zoeteweij et al. | |
| 9,441,997 B2 | 9/2016 | Downie et al. | |
| 9,513,148 B2 | 12/2016 | Hogendoorn | |
| 9,835,484 B2 | 12/2017 | Hogendoorn | |
| 9,844,166 B2 | 12/2017 | Shelutt et al. | |
| 10,367,434 B2 | 7/2019 | Ahmad | |
| 10,393,559 B2 | 8/2019 | Hogendoorn | |
| 10,612,355 B1 | 4/2020 | Alruwaili et al. | |
| 2002/0178805 A1 | 12/2002 | DiFoggio et al. | |
| 2002/0178837 A1 | 12/2002 | Brandt | |
| 2003/0074982 A1 | 4/2003 | Spielman | |
| 2003/0098605 A1 | 5/2003 | Vinegar | |
| 2003/0141882 A1 | 7/2003 | Zou | |
| 2004/0072061 A1 | 4/2004 | Nakano | |
| 2004/0129428 A1 | 7/2004 | Kelley | |

(56) References Cited

U.S. PATENT DOCUMENTS

| | | |
|---|---|---|
| 2004/0144535 A1 | 7/2004 | Kalman et al. |
| 2005/0070427 A1 | 3/2005 | Pak |
| 2005/0155773 A1 | 7/2005 | Wetzel et al. |
| 2005/0176989 A1 | 8/2005 | Coleman |
| 2006/0086498 A1 | 4/2006 | Wetzel et al. |
| 2006/0240187 A1 | 10/2006 | Weidman |
| 2007/0138020 A1 | 6/2007 | Balagopal |
| 2008/0048455 A1 | 2/2008 | Carney |
| 2008/0163700 A1 | 7/2008 | Huang |
| 2008/0264640 A1 | 10/2008 | Eslinger |
| 2008/0277941 A1 | 11/2008 | Bowles |
| 2009/0058226 A1 | 3/2009 | Furuhata et al. |
| 2009/0071646 A1 | 3/2009 | Pankratz et al. |
| 2009/0074641 A1 | 3/2009 | Lewis |
| 2009/0166045 A1 | 7/2009 | Wetzel et al. |
| 2009/0178809 A1 | 7/2009 | Jeffryes et al. |
| 2010/0164231 A1 | 7/2010 | Tsou |
| 2010/0252445 A1 | 10/2010 | Highgate |
| 2010/0256424 A1 | 10/2010 | Zhang |
| 2010/0308592 A1 | 12/2010 | Frayne |
| 2011/0049901 A1 | 3/2011 | Tinnen |
| 2011/0259120 A1 | 10/2011 | Thonstad |
| 2011/0267074 A1 | 11/2011 | Xie et al. |
| 2011/0273032 A1 | 11/2011 | Lu |
| 2011/0284214 A1 | 11/2011 | Ayoub et al. |
| 2012/0055667 A1 | 3/2012 | Ingram et al. |
| 2012/0061237 A1 | 3/2012 | Brichese et al. |
| 2012/0065052 A1 | 3/2012 | Ewald |
| 2012/0292915 A1 | 11/2012 | Moon |
| 2012/0312538 A1 | 12/2012 | Koolman |
| 2013/0110411 A1 | 5/2013 | Black et al. |
| 2013/0119669 A1 | 5/2013 | Murphree |
| 2013/0200628 A1 | 8/2013 | Kane |
| 2013/0213795 A1 | 8/2013 | Strohm et al. |
| 2013/0220641 A1 | 8/2013 | Fripp et al. |
| 2013/0227940 A1 | 9/2013 | Greenblatt |
| 2013/0255370 A1 | 10/2013 | Roux et al. |
| 2014/0028310 A1 | 1/2014 | Zoeteweij et al. |
| 2014/0136125 A1 | 5/2014 | Agar et al. |
| 2014/0154173 A1 | 6/2014 | Phillips |
| 2014/0162873 A1 | 6/2014 | Gu |
| 2014/0167418 A1 | 6/2014 | Hiejima |
| 2014/0175800 A1 | 6/2014 | Thorp |
| 2014/0260659 A1 | 9/2014 | Sheila-Vadde |
| 2014/0284937 A1 | 9/2014 | Dudley et al. |
| 2014/0299331 A1 | 10/2014 | Hart et al. |
| 2014/0352968 A1 | 12/2014 | Pitcher |
| 2015/0096806 A1 | 4/2015 | Fonseca Ocampos |
| 2015/0267501 A1 | 9/2015 | Al-Gouhi |
| 2015/0275636 A1 | 10/2015 | Diehl et al. |
| 2015/0285223 A1 | 10/2015 | Sanchez et al. |
| 2015/0293056 A1 | 10/2015 | Kelly |
| 2015/0308248 A1 | 10/2015 | Diehl et al. |
| 2016/0076925 A1 | 3/2016 | Chen |
| 2016/0168957 A1 | 6/2016 | Tubel |
| 2016/0201440 A1 | 7/2016 | Aidagulov |
| 2016/0273947 A1 | 9/2016 | Mu et al. |
| 2016/0284979 A1 | 9/2016 | Fukui |
| 2017/0033713 A1 | 2/2017 | Petroni |
| 2017/0090060 A1 | 3/2017 | Donderici |
| 2018/0112490 A1 | 4/2018 | Al-Gouhi et al. |
| 2018/0119533 A1 | 5/2018 | Alhuthali |
| 2018/0266183 A1 | 9/2018 | Ayub |
| 2018/0351480 A1 | 12/2018 | Ahmad |
| 2019/0002722 A1 | 1/2019 | May |
| 2019/0195043 A1 | 6/2019 | Singh |
| 2019/0218907 A1 | 7/2019 | Ow |
| 2019/0253003 A1 | 8/2019 | Ahmad |
| 2019/0253004 A1 | 8/2019 | Ahmad |
| 2019/0253005 A1 | 8/2019 | Ahmad |
| 2019/0253006 A1 | 8/2019 | Ahmad |
| 2020/0024936 A1 | 1/2020 | Chang |
| 2020/0025719 A1 | 1/2020 | Ahmad et al. |
| 2020/0173836 A1* | 6/2020 | Dasgupta .................. G01F 1/58 |

FOREIGN PATENT DOCUMENTS

| | | |
|---|---|---|
| CN | 104155358 | 11/2014 |
| DE | 3007503 | 9/1981 |
| DE | 3506916 A1 | 9/1986 |
| DE | 202012103729 | 10/2012 |
| EP | 2820338 | 1/2015 |
| JP | 2013531554 | 8/2013 |
| RU | 2211318 | 8/2003 |
| RU | 2427828 | 8/2011 |
| RU | 2544360 | 3/2015 |
| WO | WO 200046133 | 8/2000 |
| WO | WO 2001022041 | 3/2001 |
| WO | WO 2008003365 | 1/2008 |
| WO | WO 2009046709 | 4/2009 |
| WO | WO 2011053714 | 5/2011 |
| WO | WO 2011142738 | 11/2011 |
| WO | WO 2013005091 | 1/2013 |
| WO | WO 2013155061 | 10/2013 |
| WO | WO 2014171960 | 10/2014 |
| WO | WO 2014189533 | 11/2014 |
| WO | WO 2015140636 | 9/2015 |
| WO | WO 2015142330 | 9/2015 |
| WO | WO 2018057361 | 3/2018 |
| WO | WO 2018098303 | 5/2018 |
| WO | WO 2018174987 | 9/2018 |
| WO | WO 2018175394 | 9/2018 |

OTHER PUBLICATIONS

Abdel-Aal et al., "Parametric study for saline water electrolysis: Part II: chlorine evolution, selectivity and determination," Int. J. Hydrogen Energy, 1993, 18(7), 545-551.

Addali et al., "Acoustic Emission and Gas-Phase Measurements in Two-Phase Flow," published in 2010, 11 pages.

Al-Qahtani et al., "A Semi-Analytical Model for Extended-Reach Wells with Wellbore Flow Splitting; a Production Optimization Scheme," SPE-177931, presented at the Abu Dhabi International Petroleum Exhibition and Conference, Nov. 9-12, 2015, 21 pages.

Alssayh et al., "Determining Slug Velocity in Two-Phase Flow with Acoustic Emission," Sep. 2012, 8 pages.

Bilgen et al., "An assessment of large-scale solar hydrogen production in Canada," International Journal of Hydrogen Energy, 1983, vol. 8, issue 6, 441-451.

Blümich et al., "NMR at low magnetic fields," Chemical Physics Letters, 477, 231-240, 2009, 10 pages.

ceramicindustry.com' [online], "Microwave Heating of Ceramics," Oct. 1, 2015, [retrieved on May 15, 2018], retrieved from URL: <https://www.ceramicindustry.com/articles/95044-microwave-heating-of-ceramics>, 4 pages.

Chen et al., "Highly active and durable nanostructured molybdenum carbide electrocatalysts for hydrogen production," Energy Environ, Sci. 2013, 6, 943-951.

Chew, "Mechanical vacuum pumps," BOC Edwards, Crawley, United Kingdom, 2007, 22 pages.

Conradi et al., "Pre-polarization fields for earth's field NMR: Fast discharge for use with short T1 and large coils," Journal of Magnetic Resonance, 281, 241-245, Aug. 2017, 6 pages.

Dos Reis et al., "A Non-Intrusive Probe for Bubble Profile and Velocity Measurement in Horizontal Slug Flows," Science Direct, Published in 2005, pp. 229-239.

Esposito et al., "Low-Cost Hydrogen-Evolution Catalysts Based on Monolayer Platinum on Tungsten Monocarbide Substrates," Chem. Int. Ed. 2010, 49, 9859-9862.

Fornarelli et al., "Flow patterns and heat transfer around six in-line circular cylinders at low Reynolds number," JP Journal of Heat and Mass Transfer, Pushpa Publishing House, Allahabad, India, Feb. 2015, vol. 11, No. 1; pp. 1-28.

Fridjonsson et al., "Earth's Field NMR Flow Meter: Preliminary Quantitative Measurements," Journal of Magnetic Resonance, vol. 245, 110-115, 2014, 6 pages.

Gonzalez et al., "Downhole Viscosity Measurement Platform using Tuning Fork Oscillators," Copyright 2015, 4 pages.

(56) References Cited

OTHER PUBLICATIONS

Govardhan et al., "Critical mass in vortex-induced vibration of a cylinder," European Journal of Mechanics B/Fluids, Jan.-Feb. 2004, vol. 23, No. 1; pp. 17-27.

Haise and Callaghan, "A dynamic nuclear polarization strategy for multi-dimensional Earth's field NMR spectroscopy," Journal of Magnetic Resonance, 195, 162-168, Sep. 2008, 7 pages.

Hanyang et al., "Experimental Investigation of Slug Development on Horizontal Two-Phase Flow," Chinese Journal of Chemical Engineering, 16(2), Copyright, 2008, pp. 171-177.

Harnisch et al., "Tungsten carbide as electrocatalyst for the hydrogen evolution reaction in pH neutral electrolyte solutions," Applied Catalysis B: Environmental, Jul. 2009, vol. 89, issues 3-4, 455-458.

Heinisch et al., "Resonant Steel Tuning Forks for precise inline viscosity and mass density measurements in harsh environments," Proceedia Engineering, vol. 87, Dec. 2014, pp. 1139-1142.

Hsu et al., "Atomic layer deposition synthesis of platinum-tungsten carbide core-shell catalysts for the hydrogen evolution reaction," Chemical Communications 2012, vol. 48, issue 7, 1063-1065.

Husin et al., "Acoustic Emission for Monitoring Two-Phase Flow," EWGAE 2010, Sep. 2010, 7 pages.

Ismail et al., "Microcontroller Based Automated Body Mass Index (BMI) Calculator with LCD Display," 2nd International Conference on Electrical, Electronics and Civil Engineering (ICEECE'2012), Apr. 28-29, 2012, 3 pages.

Istratov and Vyvenko, "Exponential analysis in physical phenomena," Review of Scientific Instruments, 70, 1233-1257, 1999, 25 pages.

Kyle et al., "Bioelectrical impedance analysis—part 1: review of principles and methods," Clinical Nutrition, Oct. 2004, 18 pages.

Leu et al., "Fixed and pulsed gradient diffusion methods in low-field core analysis," Magnetic Resonance Imaging, 23, 305-309, Feb. 2005, 5 pages.

Liao et al., "A nanoporous molybdenum carbide nanowire as an electrocatalyst for hydrogen evolution reaction," Energy Environ, Sci. 2014, 7, 387-392.

Mitchell and Fordham, "Emulation of petroleum well-logging D-T2 correlations on a standard benchtop spectrometer," Journal of Magnetic Resonance, 212, 394-401, Oct. 2011, 8 pages.

Mitchell et al., "Low-field permanent magnets for industrial process and quality control," Progress in Nuclear Magnetic Resonance Spectroscopy, 76, 1-60, Jan. 2014, 270 pages.

Mitchell et al., "Numerical estimation of relaxation and diffusion distributions in two dimensions," Progress in Nuclear Magnetic Resonance Spectroscopy, 62, 34-50, 2012, 17 pages.

Mitchell et al., "Obtaining true transverse relaxation time distributions in high-field NMR measurements of saturated porous media: Removing the influence of internal gradients," Journal of Chemical Physics, 132, 244705, Jun. 2010, 11 pages.

Mohoric and Stepisnik, "NMR in the Earth's magnetic field," Progress in Nuclear Magnetic Resonance Spectroscopy, 54, 166-182, Apr. 2009, 18 pages.

Nagai et al., "Tungsten and nickel tungsten carbides as anode electrocatalysts," Electrochimica Acta, Elsevier Science Publishers, vol. 52, No. 17, Mar. 1, 2007, pp. 5430-5436.

Nydal et al., "Statistical Characterization of Slug Flow in Horizontal Pipes", Int. J. Multiphase Flow, vol. 18, No. 3, Published in 1992, pp. 439-453.

O'Neill et al., "Quantitative multiphase flow characterisation using an Earth's field NMR flow meter," Flow Measurement and Instrumentation 58: 104-111, 2017, 8 pages.

O'Neill et al., "Quantitative velocity distributions via nuclear magnetic resonance flow metering," Journal of Magnetic Resonance 269: 179-185, 2016, 7 pages.

O'Neill et al., "Two-phase Oil/Water Flow Measurements using an Earth's Field Nuclear Magnetic Resonance Flow Meter," Chem. Eng, Sci., 202, 222-237, 2019, 16 pages.

Oliemans et al., "Core-annular oil/water flow: the turbulent-lubricating-film model and measurements in a 5 cm pipe loop," International Journal of Multiphase Flow, 13, 23-31, 1987, 9 pages.

Pendlebury et al., "Precision field averaging NMR magnetometer for low and high fields, using flowing water," Review of Scientific Instruments, 50, 535-540, May 1979, 6 pages.

Raza et al., "Liquid Density Measurement using Tuning Fork," International Journal of Current Engineering and Technology, vol. 5, No. 1, Feb. 2015, 4 pages.

Rodella et al., "Physical and chemical studies of tungsten carbide catalysts: effects of Ni promotion and sulphonated carbon," RSC ADV., vol. 5, No. 30, Feb. 24, 2015, pp. 23874-23885.

Sahel et al., "In-Situ Polymerisation of an Inflatable Composite Sleeve to Reline Damaged Tubing and Shut-Off Perforation," SPE 8202, presented at the Offshore Technology Conference, May 6-9, 1996, 9 pages.

Sanderson et al., "Guidelines for the Use of Ultrasonic Non-Invasive Metering Techniques"; Flow Measurement and Instrumentation; vol. 13, No. 4; Aug. 31, 2002; pp. 125-142.

Shi et al., "Research and Application of Drilling Technology of Extended-reach Horizontally-intersected Well Used to Extract Coalbed Methane," 2011 Xi'an International Conference on Fine Geological Exploration and Groundwater & Gas Hazards Control in Coal Mines, Procedia Earth and Panetary Science vol. 3, Dec. 2011, 9 pages.

Shuib Husin et al., "Acoustic Emission for Monitoring Two-Phase Flow," EWGAE 2010, Sep. 2010, 7 pages.

Steeb et al., "Solar hydrogen production: Photovoltaic/electrolyzer system with active power conditioning," International Journal of Hydrogen Energy, 1985, vol. 10, issue 6, 353-358.

Sukstanskii et al., "Theory of FID NMR Signal Dephasing Induced by Mesoscopic Magnetic Field Inhomogeneities in Biological Systems," Journal of Magnetic Resonance, 151, 107-117, Aug. 2001, 11 pages.

Tran et al., "Novel cobalt/nickel-tungsten-sulfide catalysts for electrocatalytic hydrogen generation from water," Energy & Environmental Science, issue 8, vol. 6, 2013, pp. 2452-2459.

Xi et al., "Uncertainty Analysis Method for Intersecting Process of U-Shaped Horizontal Wells," Arabian Journal for Science and Engineering, vol. 40, Issue 2, Feb. 2015, 12 pages.

Xu et al., "Experimental investigation on the slip between oil and water in horizontal pipes," Experimental Thermal and Fluid Science, 33, 178-183, 2008, 6 pages.

Xu et al., "Pt and Pd Supported on Carbon Microspheres for Alcohol Electrooxidation in Alkaline Media," International Journal of Electrochemical Science, 2007, vol. 2, 674-680.

Zargar et al., "Development of a Nuclear Magnetic Resonance Multiphase Meter: Report 1," for EXPECT Adv. Res. Ctr., Saudi Aramco, UWA Fluid Science and Resources Research Group, University of Western Australia, Oct. 31, 2019, 20 pages.

Zhang et al., "A Measurement Method of Slug Flow Velocity of Gas-Liquid Two-Phase Flow in Horizontal Pipe," Copyright 2010, 5 pages.

Zhen et al., "A resistive Q-switch for low-field NMR systems," Journal of Magnetic Resonance, 287, 33-40, 2018, 25 pages.

Zheng et al., "Design and Theoretical Analysis of a Resonant Sensor for Liquid Density Measurement," Sensors, Jun. 8, 2012; No. 12, pp. 7905-7916.

PCT International Search Report and Written Opinion in International Appln. No. PCT/US2021/040442, dated Nov. 2, 2021, 15 pages.

Naim et al., "Active Control of a Circular Cylinder Flow at Transitional Reynolds Numbers," Flow, Turbulence and Combustion; An International Journal Published in Association with Ercoftac, Kluwer Academic Publishers, Mar. 2007, 78(3-4): 383-407, 25 pages.

* cited by examiner

REDUCING NOISE IN A VORTEX FLOW METER

TECHNICAL FIELD

This disclosure relates to flow meters.

BACKGROUND

Vortex shedding flow meters use the phenomenon known as Von Karman vortices, which are alternating vortices that form behind a fixed buff body such as a circular cylinder. The frequency of the vortex shedding, that is, the time period between two successive vortices, is proportional to the flow rate for fixed dynamical, geometrical, and physical properties of the flow system. The shedding frequency is measured by several means, such as ultrasonic transducers or pressure gauges.

SUMMARY

This disclosure describes technologies relating to reducing noise in a vortex flow meter.

An example implementation of the subject matter described within this disclosure is a vortex flow meter with the following features. A housing defines a flow passage. An actuable buff body is within the flow passage. A sensor is downstream of the actuable buff body and is attached to the housing. The sensor is configured to detect vortex shedding in a fluid flowing past the buff body.

Aspects of the example vortex flow meter, which can be combined with the example flow meter alone or in part, include the following. A linkage is attached to the buff body at a first end of the linkage. An actuator is attached to a second end of the linkage. The actuator is configured to oscillate the actuable buff body.

Aspects of the example vortex flow meter, which can be combined with the example flow meter alone or in part, include the following. The linkage includes a cable.

Aspects of the example vortex flow meter, which can be combined with the example flow meter alone or in part, include the following. The actuator includes an electric motor or a piezoelectric material.

Aspects of the example vortex flow meter, which can be combined with the example flow meter alone or in part, include the following. The sensor includes an acoustic sensor.

Aspects of the example vortex flow meter, which can be combined with the example flow meter alone or in part, include the following. The buff body is configured to oscillate with an amplitude of up to 10 millimeters.

Aspects of the example vortex flow meter, which can be combined with the example flow meter alone or in part, include the following. The buff body is configured to oscillate between 0.03 hertz and 0.045 hertz.

Aspects of the example vortex flow meter, which can be combined with the example flow meter alone or in part, include the following. A controller is configured to send a drive signal to an oscillator to oscillate the buff body. The controller is configured to receive a vortex stream from the sensor, the vortex stream indicative of vortexes shed by the buff body within a fluid. The controller is configured to determine a flow velocity responsive to the received vortex stream.

Aspects of the example vortex flow meter, which can be combined with the example flow meter alone or in part, include the following. The vortex stream includes an analog signal.

Aspects of the example vortex flow meter, which can be combined with the example flow meter alone or in part, include the following. The controller is further configured to adjust an amplitude of oscillations in response to adjusting operation conditions, and adjust a frequency in response to adjusting operation conditions.

Aspects of the example vortex flow meter, which can be combined with the example flow meter alone or in part, include the following. The buff body is cylindrical and perpendicular to the flow passage.

An example of the subject matter described within this disclosure is a method with the following features. A fluid flow is received by a conduit. The fluid flow is flowed over a buff body within the conduit. The buff body, positioned within the conduit, within the fluid flow, is oscillated. Vortex shedding is produced by the buff body responsive to flowing the fluid flow over the buff body. The vortex shedding is sensed by a sensor downstream of the buff body within the conduit. A vortex stream is produced by the sensor responsive to sensing the vortex shedding by the sensor. The vortex stream is indicative of vortexes shed by the buff body within the fluid. The vortex stream is received by a controller. A flow velocity is determined by the controller responsive to the received vortex stream.

Aspects of the example method, which can be combined with the example method alone or in part, include the following. Oscillating the buff body includes oscillating the buff body with an amplitude of up to 10 mm.

Aspects of the example method, which can be combined with the example method alone or in part, include the following. Oscillating the buff body includes to oscillating the buff body between 0.03 hertz and 0.045 hertz.

Aspects of the example method, which can be combined with the example method alone or in part, include the following. Oscillating the buff body includes adjusting an amplitude of oscillations in response to adjusting operation conditions of the fluid flow and adjusting a frequency in response to adjusting operation conditions.

Aspects of the example method, which can be combined with the example method alone or in part, include the following. Oscillating the buff body includes rotating linkage, connected at a first end of the linkage to the buff body, by motor attached to a second end of the linkage.

Aspects of the example method, which can be combined with the example method alone or in part, include the following. Oscillating the buff body includes linearly translating the buff body by cable.

Aspects of the example method, which can be combined with the example method alone or in part, include the following. Oscillating the buff body includes directing a current into a piezoelectric material coupled to the buff body.

An example of the subject matter described within this disclosure is a system with the following features. A vortex flow meter is within a flow conduit. The vortex flow meter includes a housing defining a flow passage substantially in-line with the flow conduit. An actuable buff body is within the flow passage. A sensor is downstream of the actuable buff body and is attached to the housing. The sensor is configured to detect vortex shedding. A controller is configured to send a drive signal to an oscillator to oscillate the buff body. The controller is configured to receive a vortex stream from the sensor. The vortex stream is indicative of vortexes shed by the buff body within a fluid. The controller is configured to determine a flow velocity responsive to the received vortex stream.

Aspects of the example system, which can be combined with the example system alone or in part, include the following. The vortex flow meter is at least twelve conduit diameters in length from any bends in the conduit.

Aspects of the example system, which can be combined with the example system alone or in part, include the following. The controller is further configured to adjust an amplitude of oscillations in response to adjusting operation conditions of the fluid flow, and adjust a frequency in response to adjusting operation conditions of the fluid flow.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure relates to improving a signal-to-noise ratio of a vortex meter through mechanical oscillation of the buff body. The mechanical oscillation increases the amplitude of measured Von Karman vortices to be higher than the amplitude of the process noise occurring through the process line, thereby increasing the signal-to-noise ratio of the measurements. Three specific implementations are described: a linear mechanical implementation with rigid members, a linear mechanical implementation with cable or belts, and a piezoelectric implementation. Such implementations can ensure that the shedding frequency of the vortexes is not buried in the process noise when flow rate measurements are performed.

Figure 1:
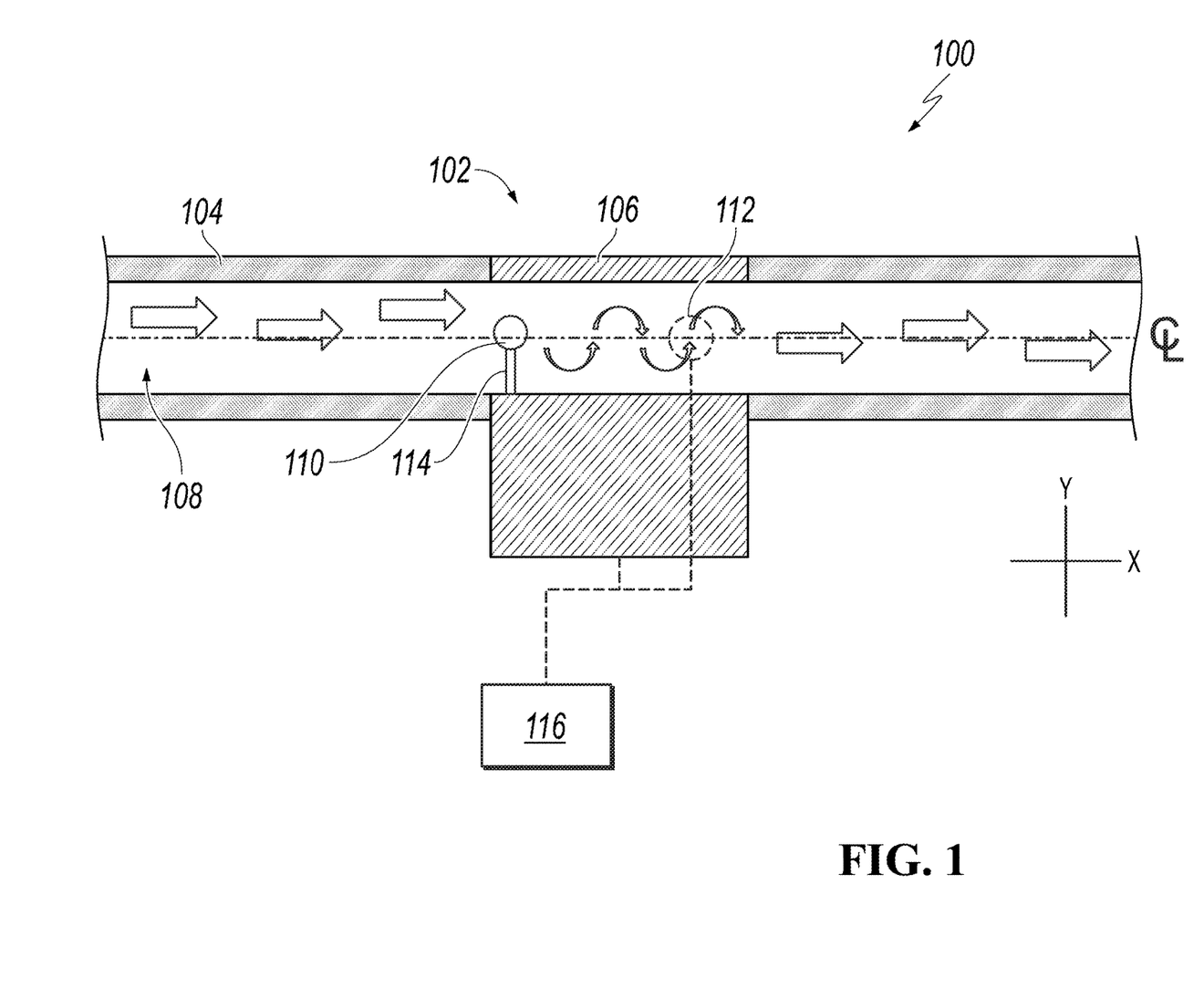
FIG. 1 is a cross-sectional view of an example vortex flow meter installed within a fluid conduit.

FIG. 1 is a cross-sectional view of a system 100 with an example vortex flow meter 102 installed within a fluid conduit 104. The vortex flow meter 102 defines a flow passage with the flow conduit 104. The vortex flow meter 102 includes a housing 106 defining the flow passage 108 substantially in-line with the flow conduit 104. That is, the central axis of the flow passage 108 and the flow conduit 104 substantially align with one another within standard manufacturing tolerances. Within the flow passage 108 is an actuable buff body 110 coupled to the vortex flow meter 102 by a support 114. In the context of this disclosure, "actuable" is used to describe an object that can be actively moved by an outside force, such as that provided by an actuator or motor. The support is rigidly coupled to the buff body and is axially coupled to an actuator (not shown) that allows freedom of movement for both the buff body 110 and the support 114 itself relative to the housing 106. Structural details that allow for such freedom of movement are discussed throughout this disclosure. In general, vortex flow meters work best with smooth, unimpeded flow. As such, vortex flow meters, such as vortex flow meter 102, are often installed at least twelve conduit diameters in length from any bends in the conduit 104.

In the context of this disclosure, "upstream" and "downstream" are used to describe positions of various objects relative to the flow direction of fluid flowing through the conduit. For example, the flow through the illustrated implementation shows fluid passing first past the buff body 110, then in a direction towards a sensor 112. As the sensor 112 is in the direction of flow in relation to the buff body 110, the sensor is downstream of the buff body 110. Conversely, the buff body is against the direction of flow in relation to the sensor, so the buff body 110 is upstream of the sensor 112.

In the illustrated implementation, the buff body 110 is cylindrical and perpendicular to the flow passage; however, other shapes and orientations can be used without departing from this disclosure. For example, and airfoil shaped buff body can be used. In general, the buff body 110 is a substantially rigid object that can be made of any inert material suitable for the process conditions. For example, metal or an elastomer can be used. The buff body 110 itself can be solid or hollow depending upon the requirements based on the process conditions within the fluid flow. The buff body 110 itself is configured to be linearly oscillated perpendicular to the fluid flow and parallel to a support 114. As illustrated in FIG. 1, the fluid flow flows along the X-axis and the buff body 110 oscillates along the Y-axis. Depending on the geometry of the conduit 104, flow rate, flow density, and other factors, the amplitude and the frequency of the buff body oscillations can be varied. For example, in some implementations, the buff body 110 is configured to oscillate with an amplitude of up to 10 millimeters. For example, in some implementations, the buff body 110 is configured to oscillate between 0.03 hertz and 0.045 hertz. Other oscillation amplitudes and frequencies can be used depending upon the flow conditions within the conduit 104.

A sensor 112 is positioned downstream of the actuable buff body 110 and attached to the housing 106. For example, the sensor can be placed five to ten conduit diameters of equivalent length downstream of the buff body 110. The sensor 112 is configured to detect vortex shedding. Several different types of sensors can be used to detect vortex shedding, for example, an acoustic sensor or a pressure sensor. In some implementations using an acoustic sensor, the acoustic sensor includes an acoustic emitter on one side of the conduit 104 and an acoustic receiver on an opposite side of the conduit 104. The acoustic emitter transmits acoustic waves to the acoustic receiver, and the time delay, signal attenuation, or both, is measured. In some implementations, an acoustic receiver can be used without an emitter if fluid properties, such as density, are known. In implementations that use a pressure sensor, the pressure within the conduit will vary over time at the sensor location downstream of the buff body 110. This variance can be detected and analyzed as the variance is indicative of vortex shedding.

A controller 116 is coupled to the vortex flow meter 102 and the sensor 112. The controller 116 is configured to send a drive signal to an oscillator (described later) to oscillate the buff body 110 and receive a vortex stream from the sensor 112. The vortex stream is a signal indicative of vortexes shed by the buff body within a fluid. The vortex stream can be an analog or digital signal produced or modified by the sensor 112. The controller 116 receives the vortex stream and determines a flow velocity responsive to receiving the vortex stream. Further details of the example controller 116 are described later within this disclosure.

Figure 2:
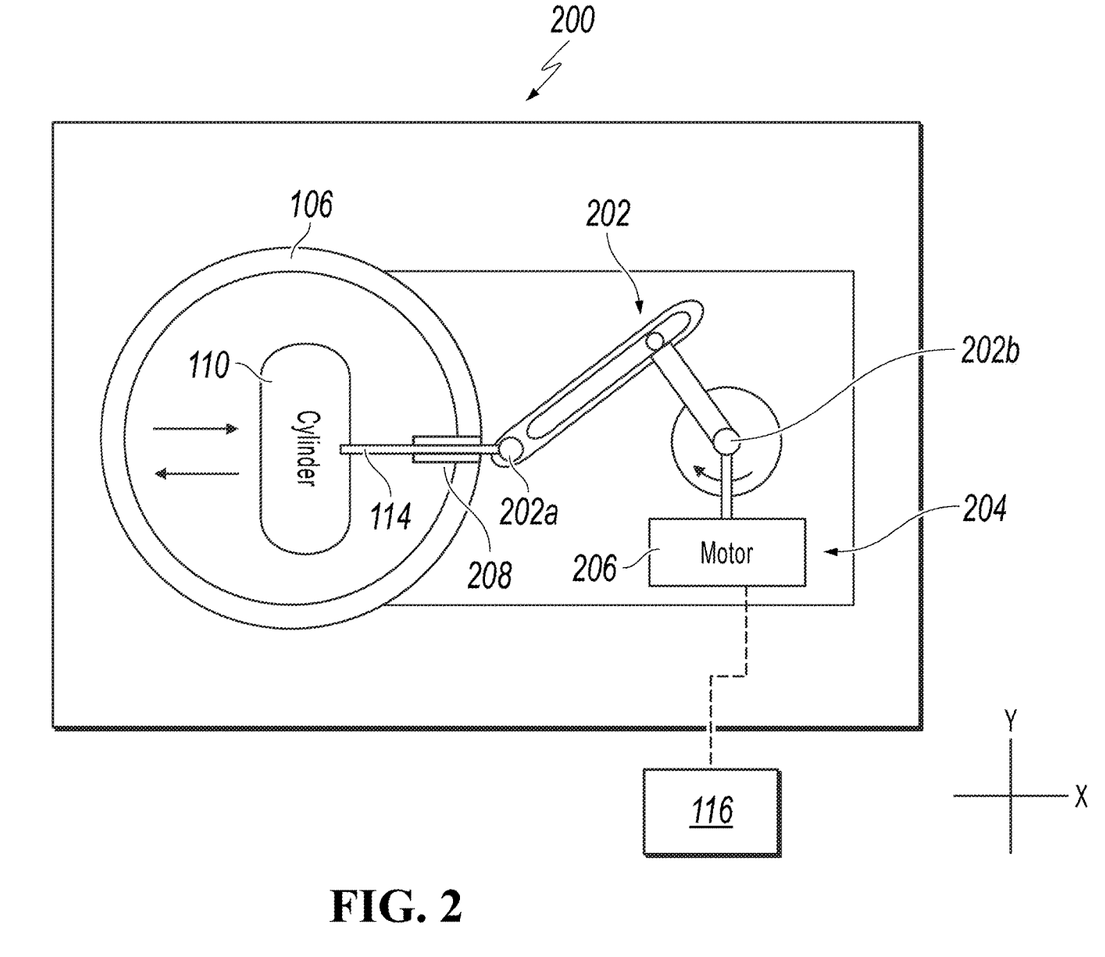
FIG. 2 is a planar cross-sectional view of an example buff body actuation system that can be used with the example vortex flow meter.

FIG. 2 is a planar cross-sectional view of an example buff body actuation system 200 that can be used with the example vortex flow meter 102. The actuation system 200 includes a linkage 202 attached to the buff body 110 or buff body support 114 at a first end 202a of the linkage 202 and an actuator 204 attached to a second end 202b of the linkage 202. Typically, the actuator 204 is located outside the housing so as to not interfere with the fluid flow; however, other arrangements can be conceived without departing from this disclosure. The actuator 204 is configured to oscillate the actuable buff body 110 and support 114 relative to the housing by transferring motion through the linkage 202. In the illustrated implementation, the actuator 204 includes an electric rotary motor 206. Alternatively or in addition, linear motors or solenoids can be used to actuate the buff body 110. Alternatively or in addition, hydraulic actuators, motors, or both can be used to actuate the buff body 110. While the illustrated implementation shows a two-part linkage 202 configured to translate rotational motion into linear motion, other linkage configurations can be used without departing from this disclosure. In some implementations, a seal 208 encircles the support 114 or linkage 202 to fluidically isolate the linkage 202 and actuator 204 from the fluid flow. In some implementations, the actuation system 200 can be configured to operate in a wetted state. That is, exposure to the fluid flow will not cause detriment to the actuation system 200.

Figure 3:
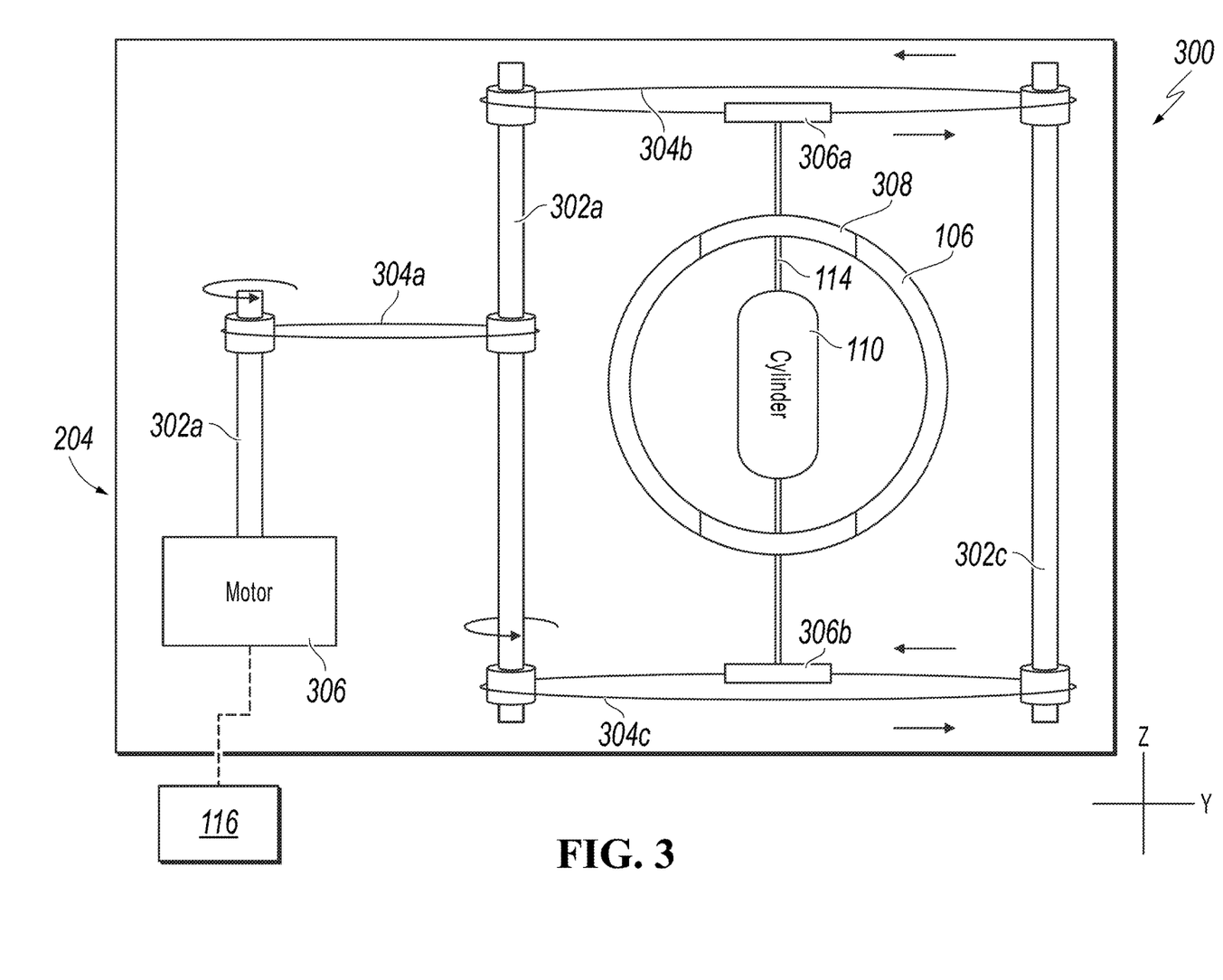
FIG. 3 is a planar cross-sectional view of an example buff body actuation system that can be used with the example vortex flow meter.

FIG. 3 is a planar cross-sectional view of an example buff body actuation system 300 that can be used with the example vortex flow meter 102. The example buff body actuation system 300 is substantially similar to the buff body actuation system 200 previously described with the exception of any differences described herein. As illustrated in FIG. 3, the actuation system 300 includes a series of shafts 302 and cables 304 to linearly oscillate the buff body 110 and supports 114 relative to the housing 106. A motor 306 turns a first shaft 302a that is coupled by a first cable 304a to a second shaft 302b. The first shaft 302a and the second shaft 302b can have a drive ratio of 1:1 or another drive ratio depending upon the speed, torque, and type of motor used. In the illustrated example, the motor 306 is bi-directional, meaning that it rotates in both directions to oscillate the buff body 110. The second shaft 302b and the third shaft 302c are coupled to one another by a second cable 304b and a third cable 304c. The drive ratio between the second shaft 302b and the third shaft 302c is irrelevant so long as the drive ratio is consistent at both ends of the second shaft 302b and third shaft 302c. Both the second cable 304b and the third cable 304c include a first carrier 306a and a second carrier 306b respectively. Each carrier (306a, 306b) can have a gondola-like structure where a portion of the carrier (306a, 306b) is attached to the cable (304a, 304b) such that the carrier (306a, 306b) does not move relative to the cable (304a, 304b). Another portion of the carrier (306a, 306b) is attached to a support 114 such that the support 114 does not linearly move relative to the carrier (306a, 306b). With such an arrangement, a carrier (306a, 306b), support 114, and the buff body 110 all move relative to the housing 106 as a cable (304a, 304b) moves. Each carrier is connected to the buff body 110 via vertical supports 114. Each support passes through the conduit via a seal 308. The seals 308 fluidically isolate the cables 304, shafts 302, and actuator 204 from the fluid flow. In some implementations, the actuation system 300 can be configured to operate in a wetted state. That is, exposure to the fluid flow will not cause detriment to the actuation system 300. While primarily described as using cables, other drive components can be used, for example belts, chains, gears, or a combination, without departing from this disclosure.

Figure 4:
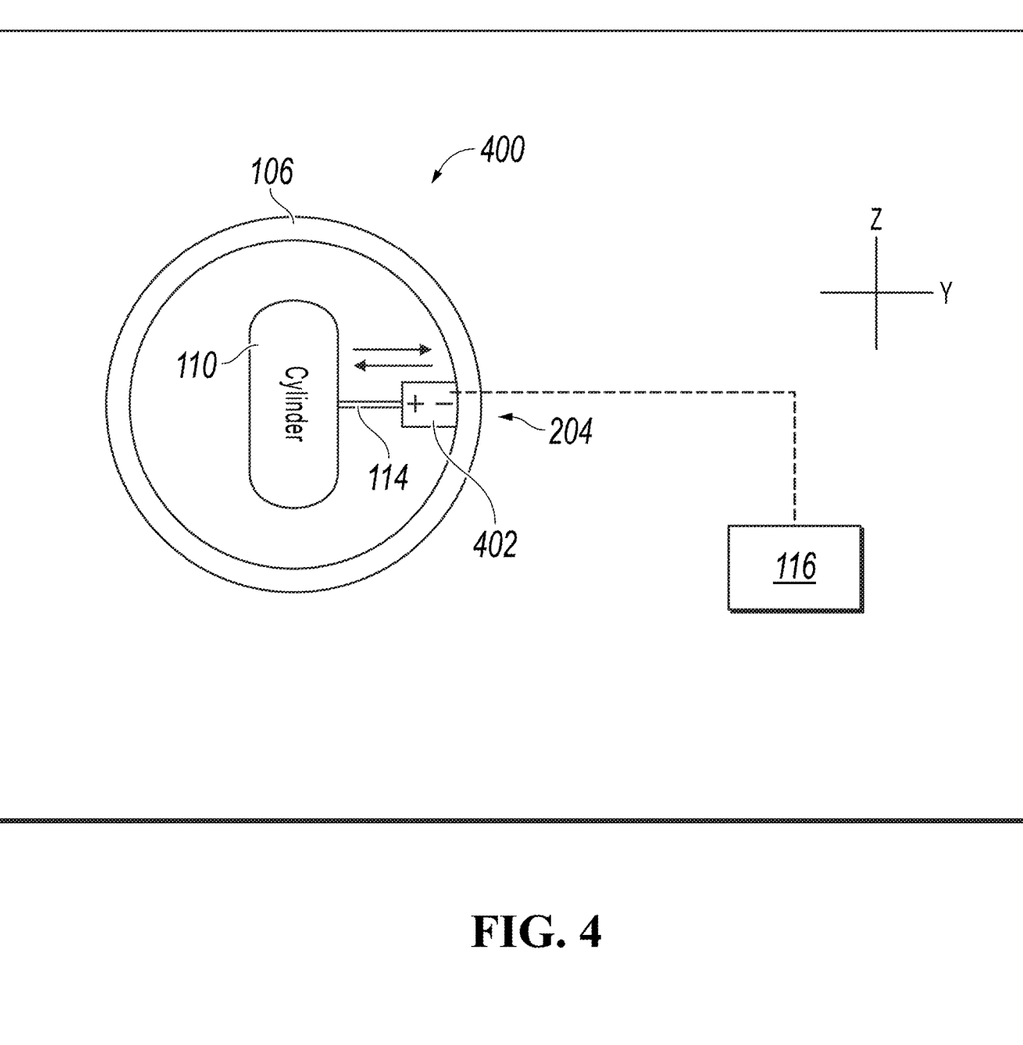
FIG. 4 is a planar cross-sectional view of an example buff body actuation system that can be used with the example vortex flow meter.

FIG. 4 is a planar cross-sectional view of an example buff body actuation system 400 that can be used with the example vortex flow meter 102. The example buff body actuation system 400 is substantially similar to the buff body actuation system 200 previously described with the exception of any differences described herein. In the illustrated implementation, the actuator 204 includes a piezoelectric material 402. The piezoelectric material 402 expands and contracts responsive to an electric signal. The expansion and contraction allows the buff body 110 and the support 114 to move relative to the housing 106. Such a signal can be provided by the controller 116.

Figure 5:
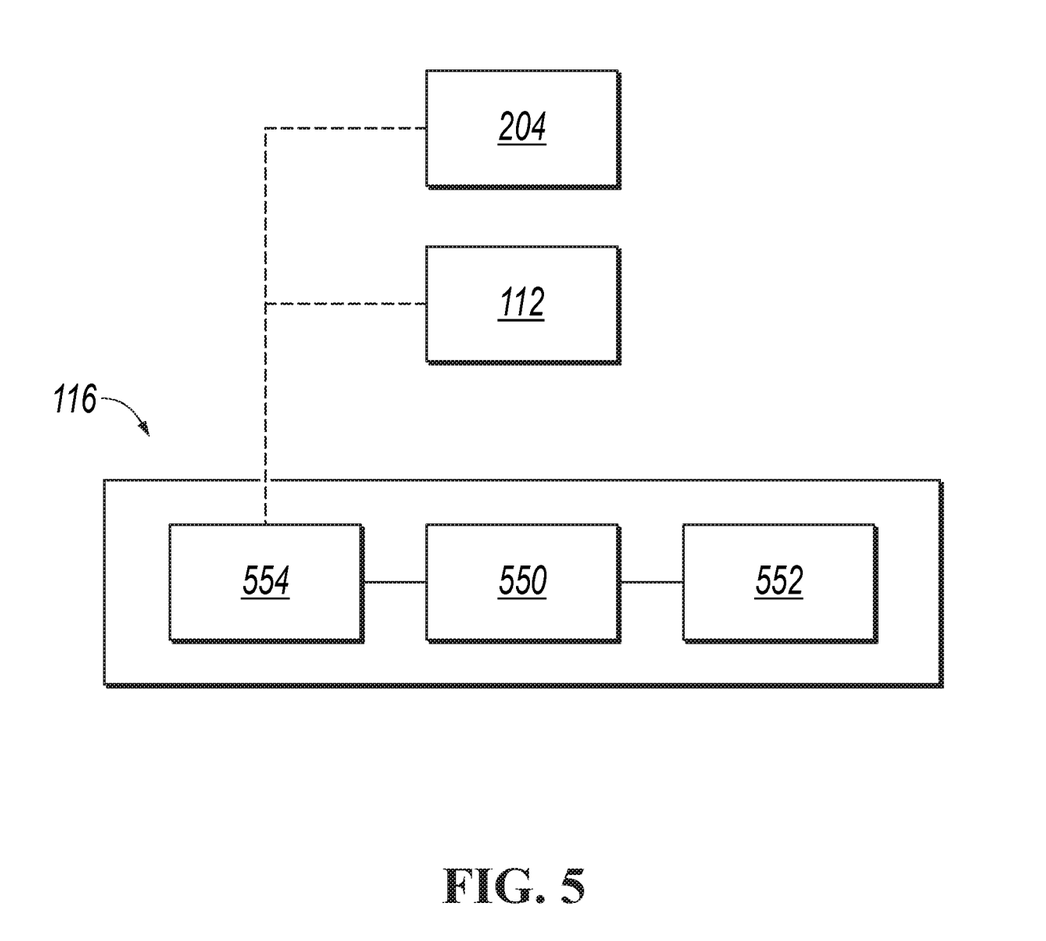
FIG. 5 is a block diagram of an example controller that can be used within the context of this disclosure.

FIG. 5 is a block diagram of an example controller 116 that can be used within the context of this disclosure. The controller 116 can, among other things, monitor parameters of the system and send signals to actuate and/or adjust various operating parameters of the system. As shown in FIG. 5, the controller 116, in certain instances, includes a processor 550 (e.g., implemented as one processor or multiple processors) and a memory 552 (e.g., implemented as one memory or multiple memories) containing instructions that cause the processors 550 to perform operations described herein. The processors 550 are coupled to an input/output (I/O) interface 554 for sending and receiving communications with components in the system, including, for example, the sensor 112. In certain instances, the controller 116 can additionally communicate status with and send actuation and/or control signals to one or more of the various system components (including an actuator system, such as actuator systems 200, 300, or 400) of the system 100, as well as other sensors (e.g., pressure sensors, temperature sensors, vibration sensors, and other types of sensors) provided in the system 100. In certain instances, the controller 116 can communicate status and send actuation and control signals to one or more of the components within the system 100, such as the actuator 204. The communications can be hard-wired, wireless or a combination of wired and wireless. In some implementations, controllers similar to the controller 116 can be located elsewhere, such as in a data van, elsewhere on a site or even remote from the site. In some implementations, the controller 116 can be a distributed controller with different portions located about a site or off site. For example, in certain instances, the controller 116 can be located at the vortex flow meter 102, or it can be located in a separate control room or data van. Additional controllers can be used throughout the site as stand-alone controllers or networked controllers without departing from this disclosure.

The controller 116 can operate in monitoring, commanding, and using the vortex flow meter 102 for measuring vortex shedding and improving a signal-to noise ratio of a measurement signal. To monitor and vortex flow meter 102, the controller 116 is used in conjunction with the sensor 112. Input and output signals, including the data from the sensor, controlled and monitored by the controller 116, can be logged continuously by the well stack controller 50.

The controller 116 can have varying levels of autonomy for controlling the vortex flow meter 102. For example, the controller 116 can begin sensing vortex shedding, an operator adjusts the frequency and amplitude of buff body oscillations. Alternatively, the controller 116 can begin sensing vortex shedding, receive an additional input from an operator, and begin adjusting the frequency and amplitude of the buff body oscillations with no other input from an operator. Alternatively, the controller 116 can begin sensing vortex shedding and adjust the frequency and amplitude of buff body oscillations with no input from an operator.

Figure 6:
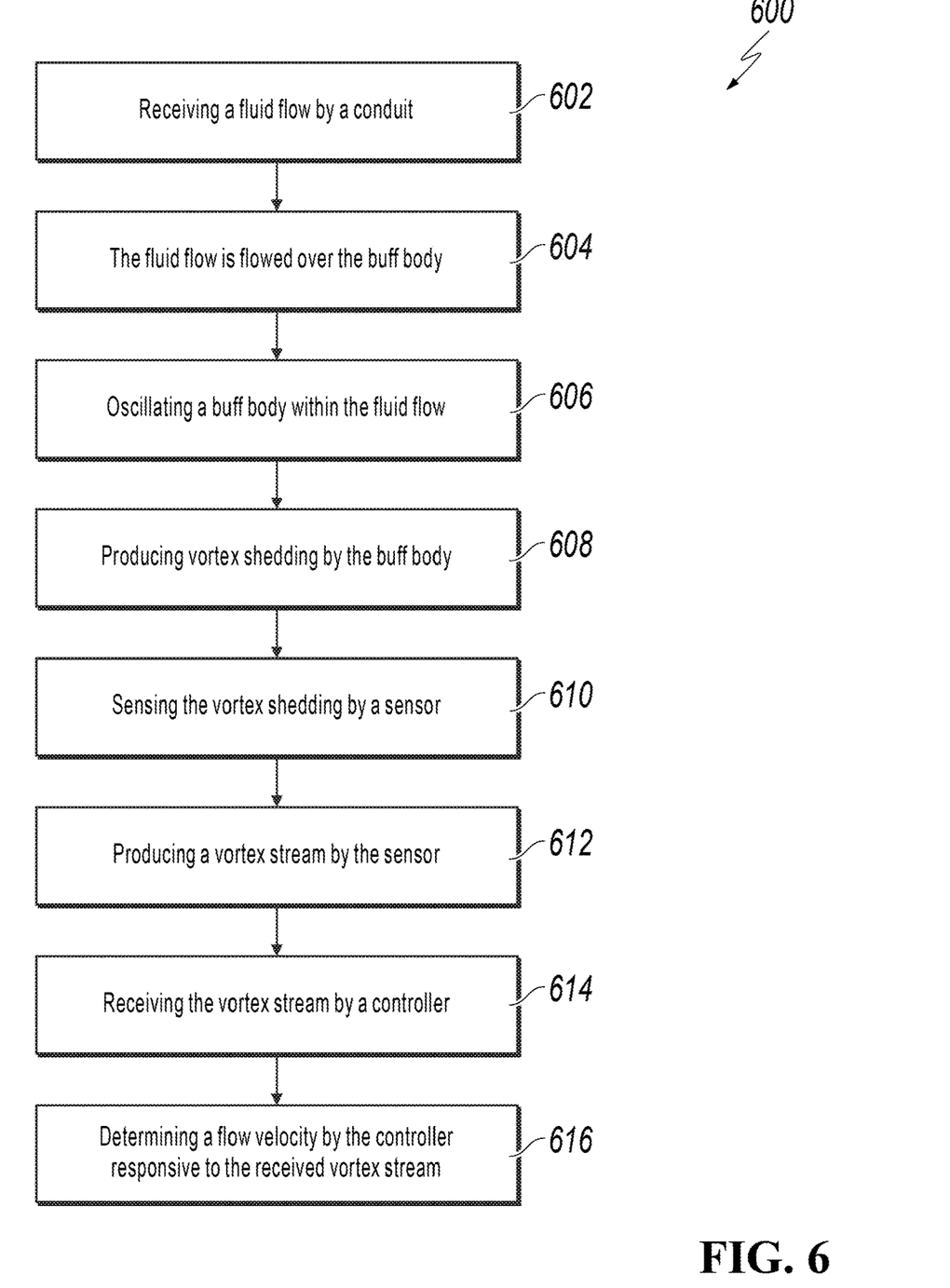
FIG. 6 is a flowchart of an example method that can be used in the context of this disclosure.

FIG. 6 is a flowchart of an example method 600 that can be used in the context of this disclosure. At least some of the steps described below can be performed by the controller 116. At 602, the fluid flow is received by a conduit 104. For example, hydrocarbons can be received by a flowline, or brine can be received for fluid injection. The concepts described herein can be used with other fluids and other applications without departing from this disclosure. At 604, the fluid flow is flowed over the buff body 110 within the conduit.

At 606, the buff body 110, positioned within the conduit 104 and the fluid flow, is oscillated. Oscillating the buff body significantly improves the signal-to-noise ratio of the vortex meter by differentiating the vortex shedding from the background noise of the fluid flow. For example, in some implementations, the buff body is configured to oscillate with an amplitude of up to 10 millimeters. For example, in some implementation, the buff body 110 is configured to oscillate between 0.03 hertz and 0.045 hertz. Other oscillation amplitudes and frequencies can be used depending upon the flow conditions within the conduit 104. In such instances, the controller 116 can determine an oscillation rate, oscillation amplitude, or both, that improves the signal-to-noise ratio to a pre-set level. Based on the signal response recorded from the sensor 112, the oscillations can be adjusted if desired. In some implementations, when the field conditions are well known, such a calibration step can be done in a laboratory or factory setting before the vortex flow meter 102 is installed into the conduit 104. In instances where the field conditions are unknown, an analysis of the vortex stream can be analyzed and an optimal setting can be determined in-situ. Such a determination is based upon the fluid operating conditions, such as flow-rate of the fluid, density of the fluid, and the current signal-to-noise ratio. In some implementations, the buff body can remain stationary while an initial vortex shedding measurement is taken. In such an implementation, the controller 116 can begin oscillations if the signal-to-noise ratio of the measurement is below a specified threshold. Such a threshold is determined from the measurement accuracy. For example, if several readings are taken in sequence and all are different, then the system is not tuned and the noise is potentially greater than the proper signal. Based on the signal response, the oscillation frequencies could be changed to attain the optimal setting by changing the oscillation frequency first. Once a good signal to noise ratio is obtained based on the in-situ calibration, the oscillations amplitude could also be optimized by increasing slightly their value The buff body can be moved in a variety of ways, for example, in some implementations, a linkage, connected to the buff body at a first end, is rotated by a motor attached to a second end of the linkage. In some implementations, one or more cables linearly translates the buff body. In some implementations, the buff body is linearly oscillated by directing a current into a piezoelectric material coupled to the buff body 110. Regardless of the implementation, the controller sends a drive signal to the actuator 204 or oscillator to oscillate the buff body 110 relative to the housing 106.

At 608, vortex shedding is produced by the buff body responsive to flowing the fluid flow over the buff body. In an event that the buff body is unable to oscillate, for example, in the case of an actuator failure, the buff body will still continue to create detectible vortex shedding, though with increased levels of noise compared to an oscillating buff body.

At 610, the vortex shedding is sensed by a sensor downstream of the buff body within the conduit. At 612, a vortex stream is produced by the sensor 112 responsive to sensing the vortex shedding. The vortex stream is indicative of vortexes shed by the buff body within the fluid and can be made up of a digital or analog signal. At 614, the vortex stream is received by the controller 116. At 616, a flow velocity is determined by the controller 116 responsive to the received vortex stream.

While this disclosure contains many specific implementation details, these should not be construed as limitations on the scope of what may be claimed, but rather as descriptions of features specific to particular implementations. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

For example, multiple vortex flow meters can be used to measure flow properties of the fluid flowing through the same conduit. Such vortex flow meters can be arranged in series downstream from one another with sufficient distance between to mitigate interference, for example the vortex flow meters can be spaced, for example, twelve to twenty conduit diameters in length from one another. The distance is dependent upon how high the Reynolds number of the fluid flow is. The Reynolds number describes the ratio between the inertia forces to the viscous forces in the flow. The higher the Reynolds number, the greater the distance between vortex flow meters should be. In some implementations, each vortex flow meter can be different, for example, a first vortex flow meter can use concepts described in FIG. 2, a second vortex flow meter can use concepts described in FIG. 3, and a third vortex flow meter can use concepts described in FIG. 4. In this manner, two or more combinations of the vortex flow meters described within this disclosure can be implemented together in a single conduit. Such implementations can be useful across pipelines, or in systems where redundancy is considered a key design factor.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described above should not be understood as requiring such separation in all implementations, and it should be understood that the described program components and systems can generally be integrated together in a single product or packaged into multiple products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A vortex flow meter comprising:
   a housing defining a flow passage;
   a translatable buff body within the flow passage;
   a linkage attached to the translatable buff body, the linkage comprising a cable in tension, the cable configured to move in a direction of tension, movement of the cable being coupled to the translatable buff body to move in unison with the translatable buff body; and
   an actuator attached to the linkage, the actuator configured to oscillate the translatable buff body by the linkage;
   a sensor downstream of the translatable buff body and attached to the housing, the sensor configured to detect vortex shedding in a fluid flowing past the buff body; and
   a controller configured to:
     send a drive signal to an oscillator to oscillate the buff body;
     receive a vortex stream from the sensor, the vortex stream indicative of vortexes shed by the buff body within a fluid;
     determine a flow velocity responsive to the received vortex stream,
     adjust an amplitude of oscillations in response to adjusting operation conditions; and
     adjust a frequency in response to adjusting operation conditions.

2. The vortex flow meter of claim 1, further comprising:
   a linkage attached to the translatable buff body at a first end of the linkage; and
   an actuator attached to a second end of the linkage, the actuator configured to oscillate the translatable buff body.

3. The vortex flow meter of claim 2, wherein the actuator comprises an electric motor or a piezoelectric material.

4. The vortex flow meter of claim 1, wherein the sensor comprises an acoustic sensor.

5. The vortex flow meter of claim 1, wherein the buff body is configured to oscillate with an amplitude of up to 10 millimeters.

6. The vortex flow meter of claim 1, wherein the buff body is configured to oscillate between 0.03 hertz and 0.045 hertz.

7. The vortex flow meter of claim 1, wherein the vortex stream comprises an analog signal.

8. The vortex flow meter of claim 1, wherein the buff body is cylindrical and perpendicular to the flow passage.

9. The vortex flow meter of claim 1, wherein the translatable buff body is a linearly translatable buff body.

10. A method comprising:
    receiving a fluid flow by a conduit;
    flowing the fluid flow over a buff body within the conduit;
    ocillatingly translating the buff body, positioned within the conduit, within the fluid flow, by a linkage attached to the translatable buff body, the linkage comprising a cable in tension, the cable configured to move in a direction of tension, movement of the cable being coupled to the translatable buff body to move in unison with the translatable buff body;
    producing vortex shedding by the buff body responsive to flowing the fluid flow over the buff body;
    sensing the vortex shedding by a sensor downstream of the buff body within the conduit;
    producing a vortex stream by the sensor responsive to sensing the vortex shedding by the sensor, the vortex stream indicative of vortexes shed by the buff body within the fluid;
    receiving the vortex stream by a controller;
    determining a flow velocity by the controller responsive to the received vortex stream;
    adjusting an amplitude of oscillations in response to adjusting operation conditions of the fluid flow; and
    adjusting a frequency in response to adjusting operation conditions.

11. The method of claim 10, wherein oscillating the buff body comprises oscillating the buff body with an amplitude of up to 10 mm.

12. The method of claim 10, wherein oscillating the buff body comprises to oscillating the buff body between 0.03 hertz and 0.045 hertz.

13. The method of claim 10, wherein oscillating the buff body comprises:
    directing a current into a piezoelectric material coupled to the buff body.

14. A system comprising:
    a flow conduit;
    a vortex flow meter within the flow conduit, the vortex flow meter comprising:
      a housing defining a flow passage substantially in-line with the flow conduit;
      a translatable buff body within the flow passage;
      a linkage attached to the translatable buff body, the linkage comprising a cable in tension, the cable configured to move in a direction of tension, movement of the cable being coupled to the translatable buff body to move in unison with the translatable buff body; and
      an actuator attached to the linkage, the actuator configured to oscillate the translatable buff body by the linkage;
      a sensor downstream of the translatable buff body and attached to the housing, the sensor configured to detect vortex shedding; and
      a controller configured to:
        send a drive signal to an oscillator to oscillate the buff body;
        receive a vortex stream from the sensor, the vortex stream indicative of vortexes shed by the buff body within a fluid;
        determine a flow velocity responsive to the received vortex stream; and
        adjust an amplitude of oscillations in response to adjusting operation conditions of the fluid flow; and
        adjust a frequency in response to adjusting operation conditions of the fluid flow.

15. The system of claim 14, wherein the vortex flow meter is at least twelve conduit diameters in length from any bends in the conduit.

* * * * *